(12) United States Patent
Herbst et al.

(10) Patent No.: US 10,041,543 B2
(45) Date of Patent: Aug. 7, 2018

(54) BEARING ARRANGEMENT AND METHOD FOR PRODUCING SAME

(71) Applicant: AKTIEBOLAGET SKF, Göteborg (SE)

(72) Inventors: Hubert Herbst, Gaedheim (DE); Juergen Barthelme, Frankenwinheim (DE); Helmut Hauck, Euerbach (DE); Daniel Ludwig, Gochsheim (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/301,989

(22) PCT Filed: Apr. 8, 2015

(86) PCT No.: PCT/EP2015/057632
§ 371 (c)(1),
(2) Date: Oct. 5, 2016

(87) PCT Pub. No.: WO2015/155247
PCT Pub. Date: Oct. 15, 2015

(65) Prior Publication Data
US 2017/0114833 A1    Apr. 27, 2017

(30) Foreign Application Priority Data
Apr. 9, 2014    (DE) .................. 10 2014 206 870

(51) Int. Cl.
*F16C 19/06*    (2006.01)
*F16C 33/58*    (2006.01)
(Continued)

(52) U.S. Cl.
CPC .............. *F16C 35/06* (2013.01); *F16C 19/06* (2013.01); *F16C 19/527* (2013.01);
(Continued)

(58) Field of Classification Search
CPC . F16F 35/06; F16F 19/06; F16C 33/58; F16C 43/04; F16C 27/066; F16C 2220/04;
(Continued)

(56) References Cited

U.S. PATENT DOCUMENTS 2,697,010 A * 12/1954 Hirschmugl ........... A63C 17/22
264/269
3,447,846 A * 6/1969 Marsh ................... F16C 27/066
384/536

(Continued)

FOREIGN PATENT DOCUMENTS

DE    1400226 A    11/1968
DE    2529913 A1    1/1977
(Continued)

*Primary Examiner* — Marcus Charles
(74) *Attorney, Agent, or Firm* — Bryan Peckjian; SKF USA Inc. Patent Dept.

(57) ABSTRACT

A bearing assembly includes a thermosetting plastic bearing carrier having a receptacle for holding a bearing ring of the bearing and an injection molded connector between an inner circumference of the receptacle and an outer circumference of the bearing ring made from a thermoplastic plastic. The connector may include axial end portions that radially overlap portions of the bearing carrier. Also a method for forming a bearing assembly.

19 Claims, 9 Drawing Sheets

(51) Int. Cl.
  *F16C 43/04* (2006.01)
  *F16C 35/06* (2006.01)
  *F16C 19/52* (2006.01)
  *F16C 27/06* (2006.01)

(52) U.S. Cl.
  CPC ............ *F16C 27/066* (2013.01); *F16C 33/58* (2013.01); *F16C 43/04* (2013.01); *F16C 2220/04* (2013.01); *F16C 2220/06* (2013.01); *F16C 2240/46* (2013.01); *F16C 2240/70* (2013.01)

(58) Field of Classification Search
  CPC ............ F16C 2220/06; F16C 2240/70; F16C 35/077; F16C 33/583; F16C 2240/46; F16C 19/527
  USPC ................ 384/510, 513, 536–537, 542, 582; 416/244 R
  See application file for complete search history.

(56) References Cited

U.S. PATENT DOCUMENTS

| | | | | |
|---|---|---|---|---|
| 3,451,736 A | | 6/1969 | Riccio | |
| 3,933,397 A | * | 1/1976 | Hood | A63C 17/22 301/5.7 |
| 4,854,750 A | * | 8/1989 | Lavin | F16C 19/08 384/447 |
| 5,044,785 A | * | 9/1991 | Bair | F16C 27/066 384/536 |
| 5,215,386 A | * | 6/1993 | O'Dwyer | F16C 35/077 384/492 |
| 5,839,349 A | * | 11/1998 | Volz | B60T 8/4022 384/536 |
| 5,906,164 A | * | 5/1999 | Bildtsen | B60D 5/00 105/3 |
| 5,964,537 A | * | 10/1999 | Hill, Jr. | A63C 17/06 280/11.223 |
| 6,367,885 B1 | * | 4/2002 | Denner | B60B 5/02 264/275 |
| 6,422,656 B2 | * | 7/2002 | Denner | B60B 3/001 29/894.361 |
| 6,705,762 B2 | * | 3/2004 | Pilone | B60B 27/0005 384/537 |
| 6,749,342 B1 | * | 6/2004 | Leins | D04B 15/48 384/536 |
| 7,488,111 B2 | * | 2/2009 | Chen | F16C 27/066 384/535 |
| 8,337,090 B2 | * | 12/2012 | Herborth | F01D 25/164 384/215 |
| 9,140,298 B2 | * | 9/2015 | Stoinski | F16C 35/077 |
| 2004/0195778 A1 | | 10/2004 | Smith | |

FOREIGN PATENT DOCUMENTS

| | | | |
|---|---|---|---|
| DE | 2725101 A1 | 12/1978 | |
| DE | 3722052 A1 | 1/1989 | |
| DE | 10355407 B3 | 5/2005 | |
| DE | 102004062116 B3 | 5/2006 | |
| DE | 102006007012 A1 | 8/2007 | |
| DE | 102008007168 A1 | 8/2009 | |
| DE | 102008013402 A1 | 9/2009 | |
| DE | 102008035671 A1 | 2/2010 | |
| DE | 102009004774 B3 | 10/2010 | |
| DE | 102009037655 A1 | 2/2011 | |
| DE | 102011006330 A1 * | 10/2012 | ............ F16C 33/34 |
| EP | 1744071 A2 | 1/2007 | |
| EP | 2048386 A1 | 4/2009 | |
| JP | 2005207438 A | 8/2005 | |
| JP | 2010090952 A | 4/2010 | |
| WO | 2010115602 A1 | 10/2010 | |

* cited by examiner

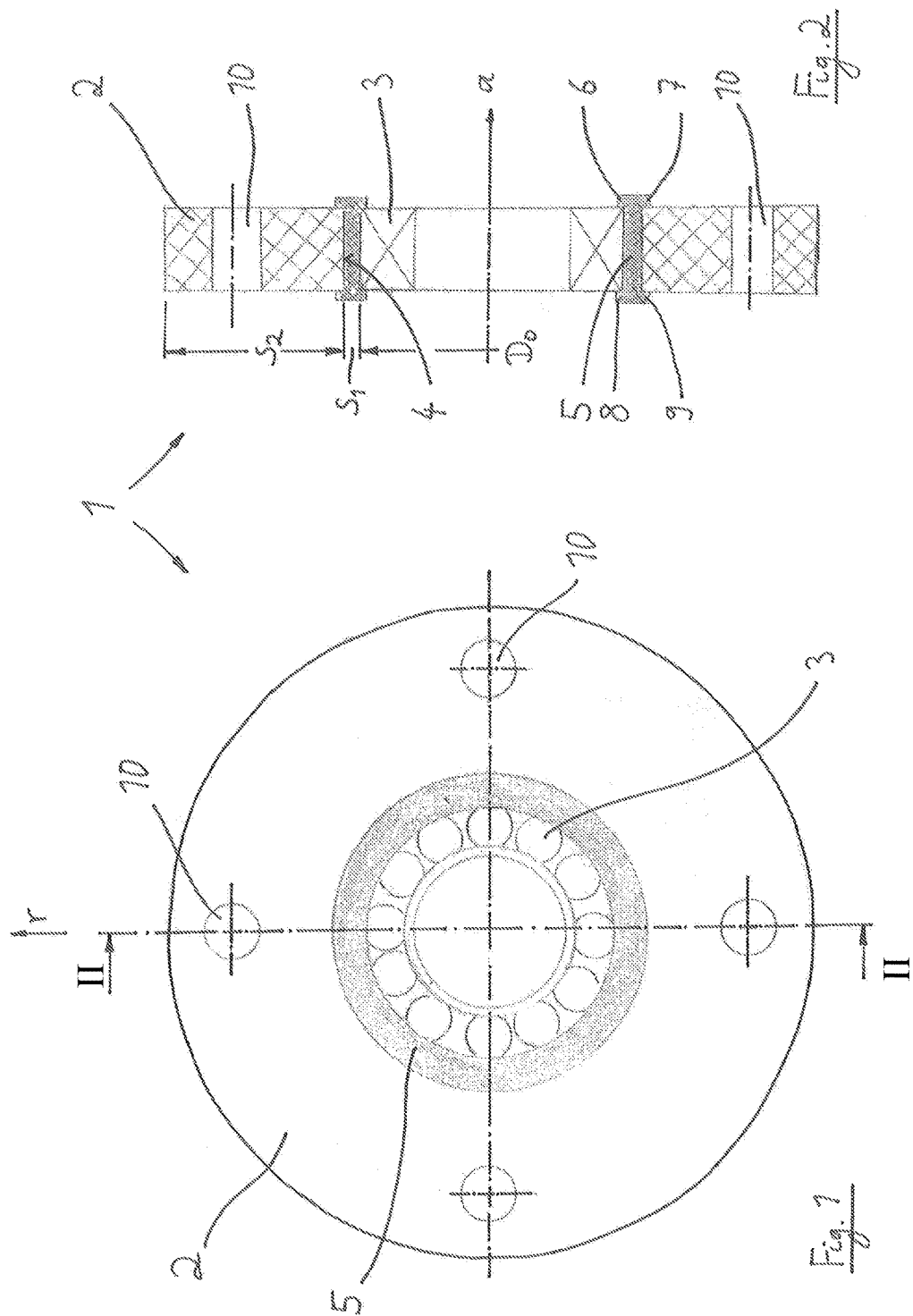

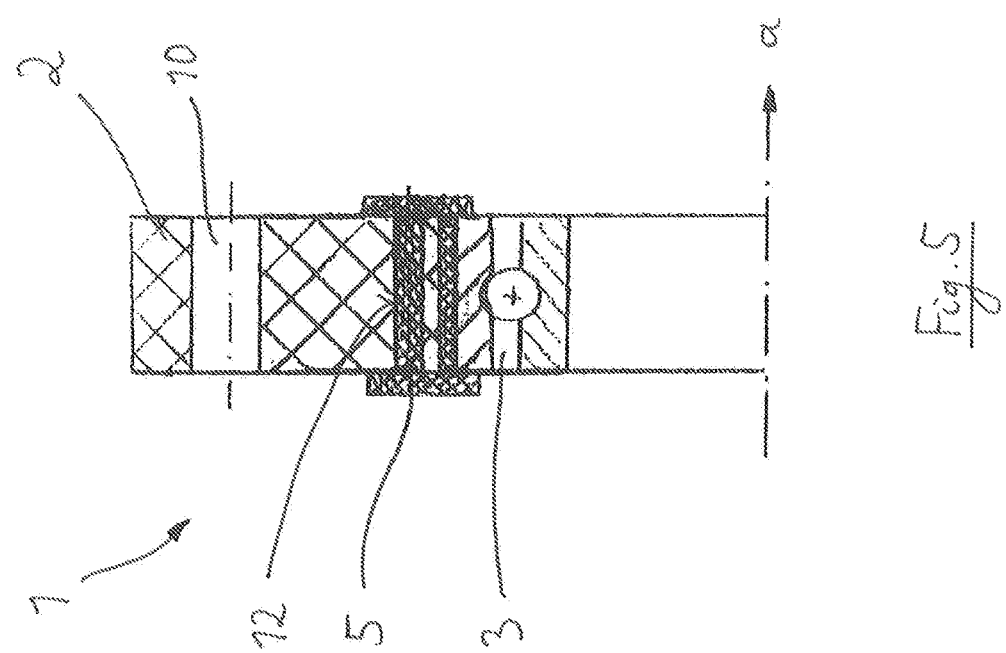

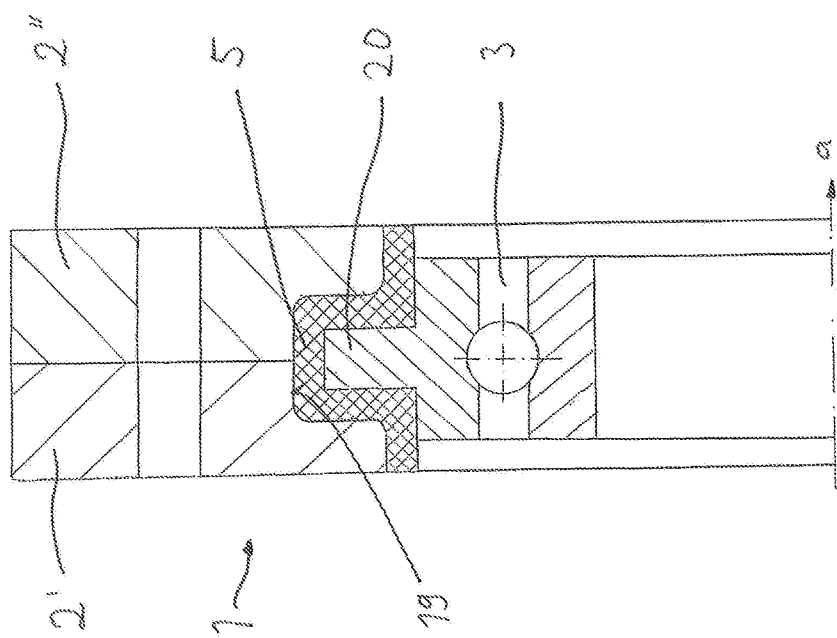

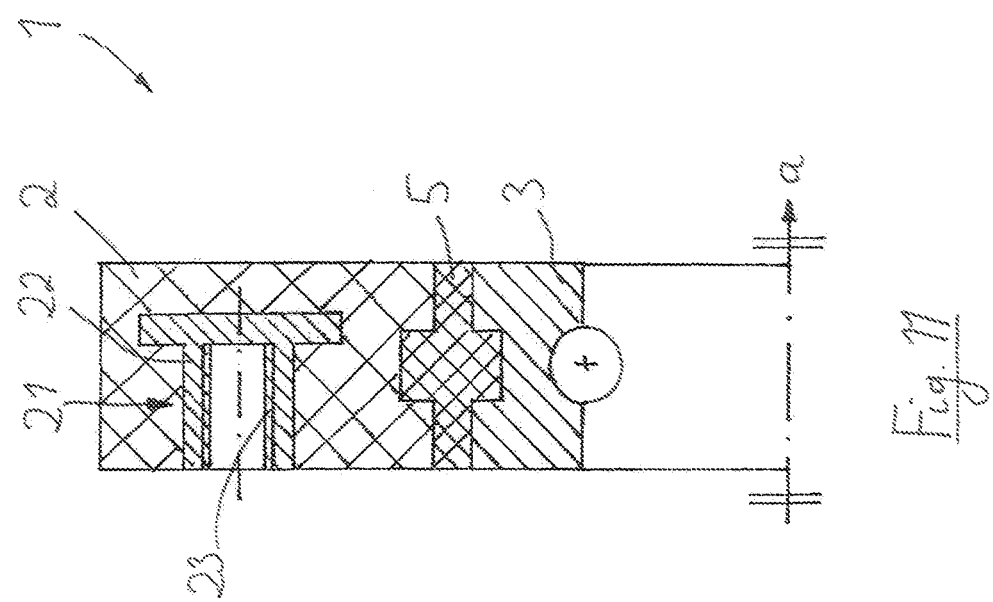

BEARING ARRANGEMENT AND METHOD FOR PRODUCING SAME

CROSS-REFERENCE

This application is the U.S. National Stage of International Application No. PCT/EP2015/057632 filed on Apr. 8, 2015, which claims priority to German patent application no. 10 2014 206 870.3 filed on Apr. 9, 2014.

TECHNOLOGICAL FIELD

The invention relates to a bearing assembly comprising a bearing carrier for mounting at least one bearing, wherein the bearing carrier includes a receptacle for a bearing ring of the bearing. Furthermore, the invention relates to a method for manufacturing such a bearing assembly.

BACKGROUND

A bearing assembly of the above-described type is described in EP 1 744 071 A2. It is envisaged here to position the bearing in an exact position relative the bearing carrier. For this purpose it is provided to inject a plastic material between the bearing ring comprised of steel and the bearing carrier also comprised of steel or steel plate; the plastic material ensures the precise relative position.

It is generally probably also possible to envisage a manufacturing of a bearing carrier entirely out of plastic. Either thermosets or thermoplastics alternatively come into question as plastics.

As is well known, thermoplastics are such plastics that can be thermoplastically deformed in a certain temperature range. This process is reversible. Thermoplastics differ from thermosets in this way. Thermosets, meanwhile, are plastics that can no longer be deformed after their curing. Thermosets are hard polymer materials that are three-dimensionally cross-linked by chemical primary valence bonding.

Thermosets thus have no heating range, i.e., even with a temperature increase the material retains its rigidity and has a low thermal expansion that leads to a high dimensional stability. In contrast, thermoplastics lose their rigidity properties with heating; technically undesirable dimensional changes result.

Therefore manufacturing bearing carriers or bearing covers from a thermoplastic brings disadvantages with heating due to the temperature sensitivity or the loss of rigidity as well as disadvantageous dimensional changes. However, bearing carriers or bearing covers made from a thermoset must disadvantageously be mechanically reworked after the injecting, for example for the providing of a bearing seat, for which purpose a precision-turning- or grinding-process is required. Alternatively steel rings as bearing seats can be injected or overmolded, which, however, must in turn be partly reworked. With both variants the outer rings of the bearing must then be mounted in the thermoset cover directly or in the steel ring, for example, using a press-fit. Another axial securing of the outer ring of the rolling-element bearing is also necessary in part, for example, by snap rings.

In principle with the injection-molding manufacturing of bearing carriers or covers from a thermoset, higher temperatures and longer dwell times are required than with thermoplastic injection-molding. If a rolling-element bearing is to be directly overmolded with thermosetting plastic, there is therefore the danger that structural changes arise in the rolling-element bearing rings of the bearing and thus the properties of the bearing are significantly worsened.

Thus both solutions—the use of a thermoplastic and of a thermoset for the base material for a bearing carrier or a cover element—have respective advantages and disadvantages.

SUMMARY

The object of the invention is to provide a bearing assembly of the above-described type as well as an associated method for its manufacture, wherein the respective disadvantages can be avoided and the advantages combined. Accordingly a dimensionally-stable-as-possible connection between the bearing carrier and the bearing shall be provided, wherein, however, damage to the bearing is to be precluded.

The solution of this object by the invention is characterized in that the bearing carrier is comprised of a thermosetting plastic or includes at least one thermosetting plastic, wherein the connection between the bearing carrier and the bearing ring of the bearing, which bearing ring is located in the receptacle, is produced at least partially by at least one molded part made from a thermoplastic plastic.

Here the thermoplastic plastic for forming the molded part is preferably injected in at least one free space, in particular in a ring gap that is present between the inner circumference of the receptacle and the outer circumference of the bearing ring of the bearing. The free space can also be an axial gap that is filled with the thermoplastic material.

The molded part here preferably forms a radial projection at least in an axial end region, which projection protrudes radially over the bearing carrier and/or the bearing ring of the bearing. An axial securing by undercut can thereby be achieved. The molded part preferably forms radial projections respectively in both axial end regions, which radial projections protrude radially over the bearing carrier and/or the bearing ring of the bearing.

The bearing carrier can include at least one through-bore for the passage of an attachment means, in particular a screw, and/or at least one blind bore for the entry of such an attachment means. An attachment using bolts is also equally possible.

The axial extension of the molded part is preferably between 20% and 500% of the axial extension of the bearing ring of the bearing. Accordingly the molded part can be configured in the axial direction as an only relatively short bridge, or the bearing ring can also substantially protrude axially. Preferably the bearing carrier is not wider in the axial direction than the bearing and at most exactly as wide as it.

Very advantageous minimum and maximum values can be defined for the radial extension of the molded part made from thermoplastic material.

It is preferably provided that the maximum radial extension $s_{1max}$ of the molded part in the region between the receptacle of the bearing carrier and the bearing ring of the bearing (in millimeters) results to:

$$s_{1max} = 1.7613 \cdot \ln(D_0) - 1.8079 \text{ for } 3 \text{ mm} < D_0 < 50 \text{ mm}$$

and $$s_{1max} = 1.0811 \cdot \ln(D_0) + 0.8021 \text{ for } D_0 \geq 50 \text{ mm}$$

with $D_0$ as the bearing outer diameter in mm

However, it is preferably provided that the minimum radial extension of the molded part is 0.1 mm in the region between the receptacle of the bearing carrier and the bearing ring of the bearing.

Accordingly the aforementioned radial extension of the molded part falls between the stated maximum and minimum value which—with regard to the maximum value—arises depending on the bearing outer diameter. The basis for its determination is the mentioned logarithm function. An optimal compromise thereby arises in a very advantageous manner between the strength of the connection and use of material in the form of the thermoplastic material that forms the molded part.

Various designs of the proposed bearing assembly have particularly proven themselves:

One possibility provides that the bearing carrier protrudes in an axial end region radially inward over the bearing ring of the bearing so that the bearing ring of the bearing is disposed in the bearing carrier with axial undercut. It can thereby preferably be provided that the molded part extends in an axial gap between the radially inwardly protruding region of the bearing carrier and the bearing ring of the bearing.

Furthermore the bearing ring of the bearing can include a circumferential groove into which a snap ring is inserted, wherein the snap ring extends radially into a groove in the bearing carrier and is coated in the groove by material of the molded part.

A further alternative provides that the bearing ring of the bearing includes a radially outwardly extending flange in an axial end region. In this case the molded part can extend in an axial gap between the flange and the bearing carrier. The flange and the bearing carrier preferably end flush.

It can then be further provided that the bearing ring of the bearing extends radially into a groove-shaped recess in the bearing carrier so that the bearing ring of the bearing is disposed in the bearing carrier with two-sided axial undercut and wherein the bearing carrier—for the purpose of installability—is comprised of at least two parts that are axially assembled and together form the groove-shaped recess.

The bearing ring of the bearing can also include a radially outwardly extending flange section that extends into a groove-shaped recess in the bearing carrier so that the flange section is disposed in the bearing carrier with two-sided axial undercut and wherein the bearing carrier is comprised of at least two parts that are axially assembled and together form the groove-shaped recess.

The bearing is preferably a rolling-element bearing.

According to a preferred application of the present invention the bearing carrier forms a part of an enclosing housing-shaped machine element, in particular of an electric motor, of a fan, or of a transmission.

According to the invention the method for manufacturing a bearing assembly of the above-mentioned type includes the steps:

a) placing the bearing ring of the bearing in the receptacle of the bearing carrier;
b) precise aligning of the bearing ring of the bearing relative to the bearing carrier in the desired relative end position;
c) injecting of thermoplastic plastic in the molten state in at least one remaining free space, in particular in a ring gap, between the inner circumference of the receptacle and the outer circumference of the bearing ring of the bearing to produce the molded part.
d) Allowing the material of the molded part to cure.

In this respect the invention proposes a hybrid unit for the bearing carrier, in particular for a plastic cover element of a machine assembly, wherein a thermoset and a thermoplastic are used in combination in a targeted manner According to a preferred design of the invention it is thus provided that a ready-made thermoset cover or thermoset bearing carrier and a rolling-element bearing are connected to each other using a thermoplastic plastic injection-molding method.

The connection cross-section of the thermoplastic should be kept as small as possible in relation to the cross-section of the thermoset cover. The above-mentioned disadvantages of the thermoplastic are thereby minimized Due to the favorable ratio of the cross-sections of the thermoset cover to the thermoplastic layer the hybrid plastic cover unit remains very dimensionally stable and has significantly better strength properties than a unit would have whose cover is comprised only of thermoplastic material.

Advantageously, mechanical reworking of the bore seat in the housing cover is no longer necessary; the tolerances of the thermoset-injection-molding are sufficient.

A good fixing of the bearing and of the thermoset bearing-carrier or -cover in the tool for the thermoplastic-injection-molding makes it possible that a very precise coaxial alignment of bearing and thermoset-cover or -bearing-carrier is given.

The thermoset material can also be provided with fibers and/or reinforcements. Metal-plate reinforcements and similar can also be considered here. In any case the bearing carrier is thus comprised at least partly of the thermoset material.

A segmental solution can also be provided, according to which a plurality of molded parts made from thermoplastic material are disposed over the circumference between the thermoset bearing carrier and the bearing.

It can also be provided that in addition to the material made from thermoplastic plastic, still further elements can be used to produce the connection between the thermoset bearing carrier and the bearing.

A lower noise- and vibration development is thus advantageously also given than is the case with previously known solutions. The hybrid design of the bearing carrier or cover unit can furthermore advantageously serve for current (electrical) insulation of the bearing. Accordingly a particularly interesting field of use with respect to this property is electric motors for electromobility (e.g., for electric vehicles).

BRIEF DESCRIPTION OF THE DRAWINGS

Exemplary embodiments of the invention are depicted in the drawings.

FIG. 1 shows the front view of a bearing carrier that holds a bearing,

FIG. 2 shows a cross-sectional view of the bearing carrier as taken along lines II-II of FIG. 1, FIG. 5 shows a third alternative solution in the depiction according to FIG. 2, FIG. 10 shows an eighth alternative solution in the depiction according to FIG. 2, and FIG. 11 shows a ninth alternative solution in the depiction according to FIG. 2.

DETAILED DESCRIPTION

Figure 4:
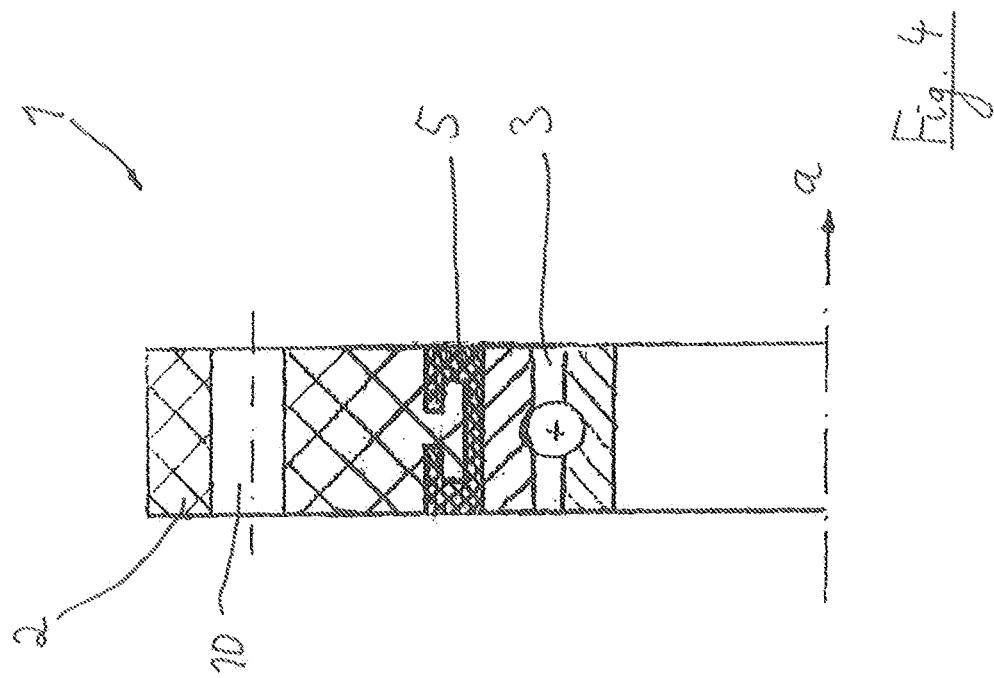
FIG. 4 shows a second alternative solution in the depiction according to FIG. 2.

In FIGS. 1 and 2 a bearing assembly 1 can be seen, which in the present case forms a cover element for an electric machine. The bearing assembly 1 includes a bearing carrier 2 that carries a rolling-element bearing 3. A not-depicted shaft is supported by the bearing 3.

The bearing carrier 2 is comprised of a thermoset and is designed essentially annular. In the radially inner-lying end region the bearing carrier 2 includes a cylindrical receptacle 4 into which the bearing 3 and in particular its outer ring is inserted, wherein after the inserting of the bearing 3 into the receptacle 4 a ring gap arises.

This ring gap is filled with thermoplastic plastic material that has been introduced in the context of an injection-molding process. The thermoplastic material forms a molded part 5 that produces the connection between the bearing outer ring of the bearing 3 and the bearing carrier 2.

As can be seen in FIG. 2 the molded part 5 is embodied from thermoplastic plastic here such that radial projections 6, 7, 8, and 9 arise in the two axial end regions of the molded part 5, which radial projections 6, 7, 8, and 9 each form an undercut in axial direction a and thus ensure that the bearing outer ring is non-relocatably fixed axially relative to the bearing carrier 2. Here the projections 6, 7, 8, and 9 extend annularly around the entire circumference.

For fixing the bearing carrier 2 or cover on the—not depicted—machine element, through-bores 10 are provided in the bearing carrier 2, which through-bores are configured for passage of an attachment screw.

The size of the molded part 5 made from thermoplastic material is small in relation to the size of the bearing carrier 2 made from thermoset material. This results from the incorporated radial extension $s_1$ of the molded part 5 on the one hand and the radial extension $s_2$ of the bearing carrier 2 on the other hand. The extension $s_1$ is, for example, at most 15% of the extension $s_2$. In the exemplary embodiment mentioned a circular outer circumference is provided here for the bearing carrier 2. If no circular shape is present, the mentioned percentages refer to the respective maximum or minimum distance of the circumference of the bearing carrier 2 from the axis of rotation of the bearing.

Alternatives to the solution according to FIG. 2 are depicted in FIGS. 3 to 10.

Figure 3:
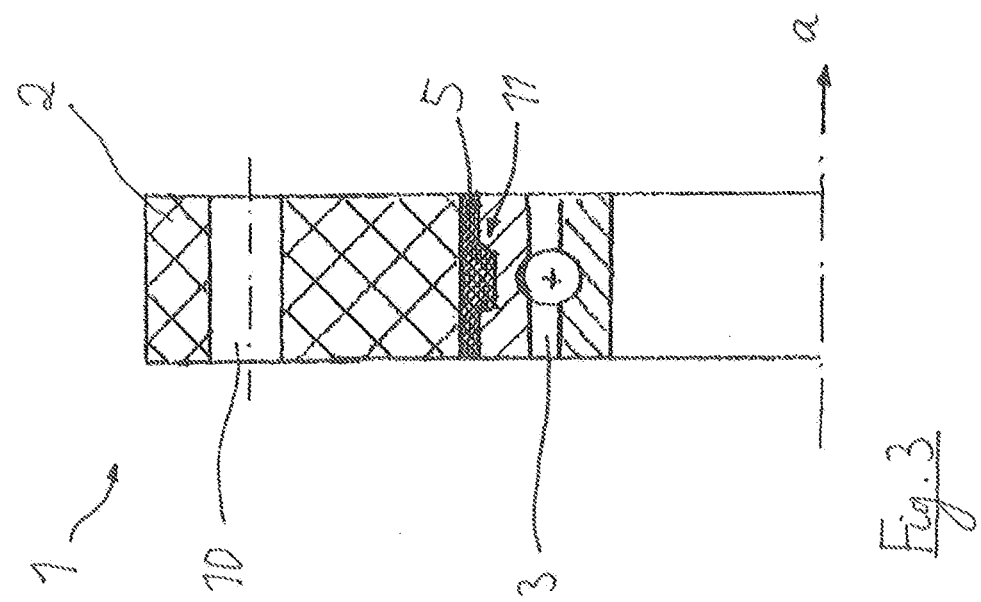
FIG. 3 shows a first alternative solution in the depiction according to FIG. 2.

In FIG. 3 it is provided that the molded part 5 has a generally hollow-cylindrical shape. However, a groove 11 is incorporated in the central region in the outer ring of the bearing 3. This has the consequence that with injecting of the thermoplastic material of the molded part 5 this thermoplastic material forms an undercut in axial direction a, so that an interference-fit axial connection is provided between the bearing carrier 2 and the bearing 3, although—in contrast to FIG. 2—the axial end regions of the molded part 5 end (optionally) flush with the outer ring of the bearing 3 or the bearing carrier 2.

Of course such a groove 11 can generally also be located in the bearing carrier 2; then in addition to a material bond there is also an interference fit in the axial direction between the bearing carrier 2 and the molded part 5.

The opposite design is also conceivable, according to which the outer ring of the bearing 3 (and possibly also the bearing ring 2) includes a radial elevation in the axial center region, over which the material of the shaped part 5 lies.

As can be seen in FIG. 3 the molded part 5 does not project axially over the sides of the outer ring of the bearing 2 or the bearing carrier 2. This projection is thus zero or the molded part 5 is even axially recessed with respect to the bearing ring or the bearing carrier.

The shape of the groove 11 or of a corresponding radial projection here can be designed in any manner: for example, groove-shaped, almond-shaped, step-shaped, or diagonal protrusions or recesses can be provided. These designs can be provided either on the bearing outer ring or on the bearing carrier or on both elements.

FIG. 4 shows another solution. Here the bearing carrier 2 is provided with a T-shaped structure in radial section in the contact region with the molded part 5. The result is that after the injection-molding of the molded part 5 a both material-bonded and interference-fit connection between the bearing carrier 2 and the molded part 5 results. Of course, such a connection is generally also conceivable for the connection between the outer ring of the bearing 3 and the molded part 5.

Another differently designed connection between the outer ring of the bearing 3 and the bearing carrier 2 emerges from FIG. 5.

Here the bearing carrier includes a number of openings 12 (e.g., bores) extending in radial direction a, through which the molten material of the molded part 5 can flow during injection-molding; it flows uniformly in the ring gap between the outer ring of the bearing 3 and the bearing carrier 2.

In the right and left axial end region the material of the molded part 5 flows together and forms the radial projections depicted, in an analogous manner to those according to FIG. 2 (see there the reference numbers 6, 7, 8, and 9).

The openings—configured, for example, as opening or bore—thus allow that the thermoplastic material can flow during injection-molding of the molded part 5 from one end side (e.g., from a sprue side) to the other end side. Thus an improved material distribution can be achieved with injection of the thermoplastic; furthermore an improved interference fit arises between thermoset and thermoplastic.

Thus a firm connection is given between the outer ring of the bearing 3 and the bearing carrier 2.

FIGS. 6 to 10 show further variants of the proposed solution.

Figure 6:
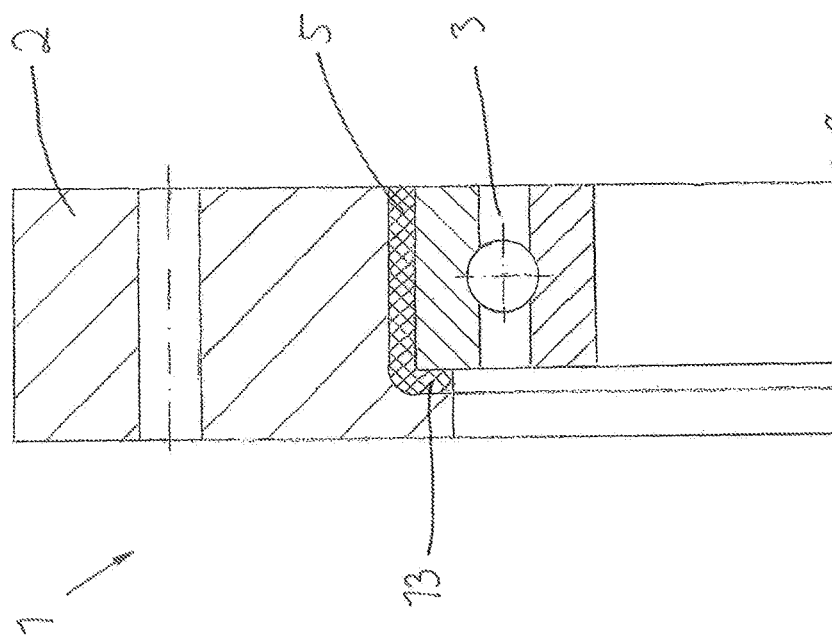
FIG. 6 shows a fourth alternative solution in the depiction according to FIG. 2.

In FIG. 6 it is provided that the bearing carrier 2 projects radially inward over the outer ring of the bearing 3 in a, namely in the axial end region. Thus the bearing outer ring of the bearing 3 is disposed with an axial undercut in the bearing carrier 2. In this case the molded part 5 extends in an axial gap 13 between the radially inwardly projecting region of the bearing carrier 2 and the bearing ring of the bearing 3.

Figure 7:
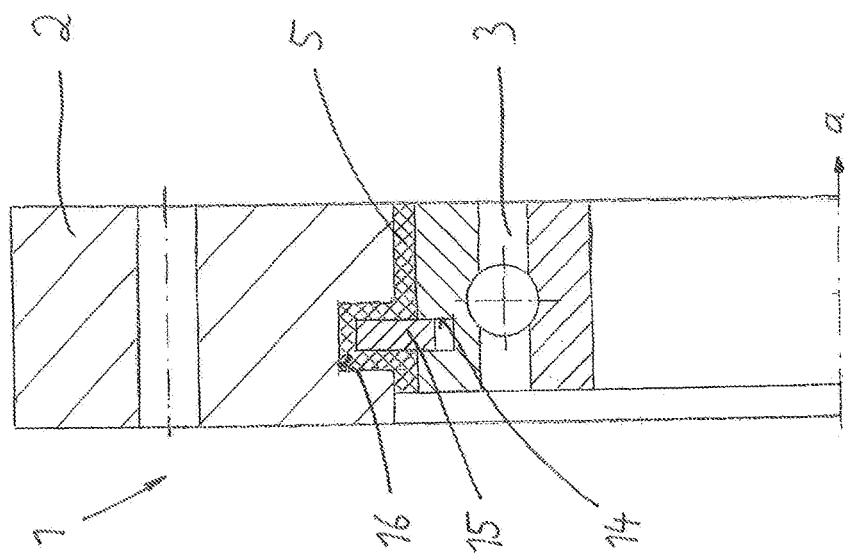
FIG. 7 shows a fifth alternative solution in the depiction according to FIG. 2.

According to FIG. 7 the outer ring of the bearing 3 includes a circumferential groove 14. A snap ring 15 is inserted into this groove 14. In the installed state the circumferential groove 14 is deeper than the snap ring 15 so that installability is provided (the snap ring is divided at a circumferential point and is pressed together and is held together until reaching the base of the circumferential groove 14 in order to be able to push the bearing 3 axially into the bearing carrier 2). In the installed state the snap ring 15 extends—as depicted in FIG. 7—radially into a groove 16 in the bearing carrier 2. The material of the molded part 5 has been injected in this location so that it coats the snap ring.

Figure 8:
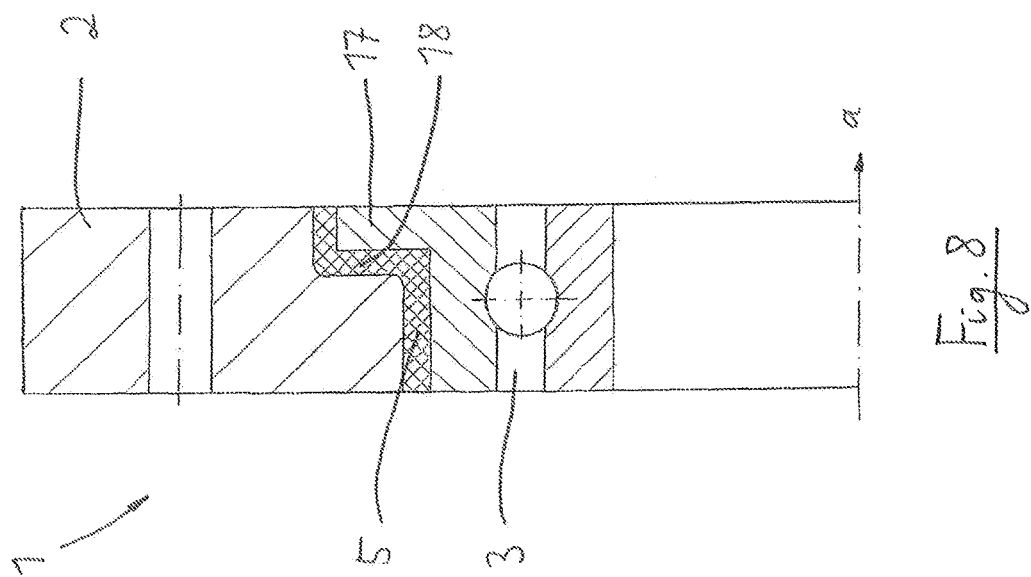
FIG. 8 shows a sixth alternative solution in the depiction according to FIG. 2.

In the solution according to FIG. 8 it is provided that the bearing ring of the bearing 3 includes a radially outwardly extending flange 17 in an axial end region (namely in the right axial end region). In this case the thermoplastic molded part 5 generated by injection-molding extends in an axial gap 18 between the flange 17 and the bearing carrier 2. In the exemplary embodiment the flange 17 and the bearing carrier 2 end axially flush.

Figure 9:
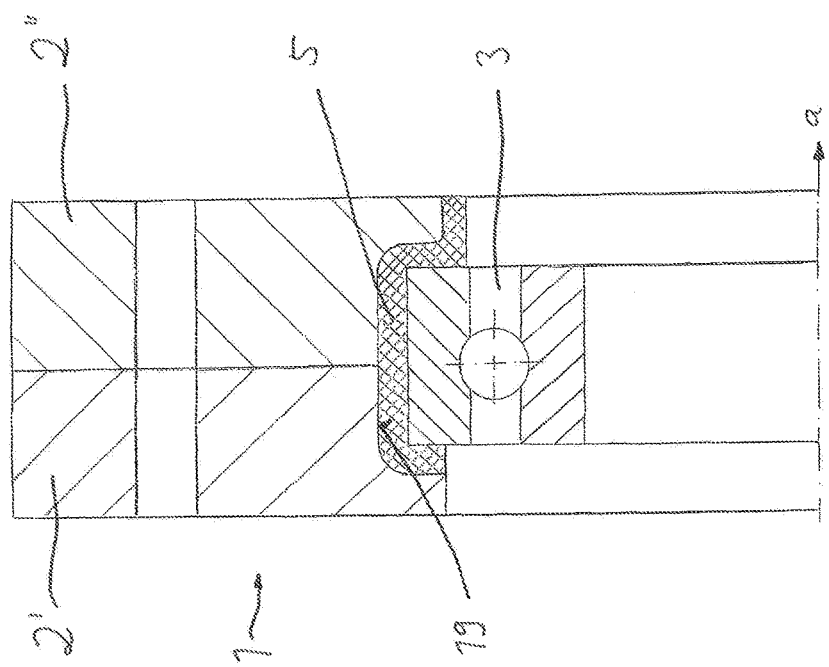
FIG. 9 shows a seventh alternative solution in the depiction according to FIG. 2.

As can be seen in the exemplary embodiments according to FIG. 9 and FIG. 10, the bearing carrier 2 can also be configured two-part (or multi-part). It is comprised of the parts 2' and 2", which are axially joined and connected. Due to correspondingly configured recesses in the parts 2', 2", the bearing carrier 2 forms a groove-shaped recess 19 in its interior, which groove-shaped recess 19 serves to receive the bearing outer ring or a part thereof such that there is a two-sided axial undercut for the bearing carrier 2, so that an axial fixing of the bearing 3 relative to the bearing carrier 2 is given.

In the design according to FIG. 9 it is provided that the outer ring of the bearing 3 extends radially into said groove-shaped recess 19 in the bearing carrier 2 so that the mentioned two-sided axial undercut is present.

Meanwhile according to FIG. 10 it is provided that the outer ring of the bearing 3 has a radially outwardly extending flange section 20. This extends into the groove-shaped recess 19 in the bearing carrier. In turn a two-sided axial undercut is thus present. After placement in the two joined parts 2', 2" of the bearing carrier 2, the flange section 20 is fixed in the bearing carrier 2 by the injected molded part 5.

Finally, the embodiment according to FIG. 11 represents in this respect an alternative or additional solution to the extent that no through-bores 10 are provided here, rather blind bores 21. The blind bores 21 allow the screwing-in of a screw in order to attach the bearing carrier 2 to a fixture. In general the blind bore 21 can be introduced directly into the material of the bearing carrier 2 and a thread can be cut in. However—according to the depicted exemplary embodiment—an insert element 22 is preferred that is introduced into the injection mold during injection-molding of the bearing carrier 2 so that the insert element 22 is completely surrounded by material of the bearing carrier and is thus fixed in situ in the bearing carrier 2.

As is to be recognized in the exemplary embodiment according to FIG. 11, the insert element 22 can include for this purpose in an axial end region a flange-type widening that ensures a stable fixing of the insert element 22 in the bearing carrier 2. With the fixing of the bearing carrier 2 a screw can then be screwed-in into the thread 23 of the insert element 22.

Of course through-bores 10 and blind bores 21 can also be used in combination.

REFERENCE NUMBER LIST

1 Bearing assembly
2 Bearing carrier made from thermoset plastic
2' Part of the bearing carrier
2" Part of the bearing carrier
3 Bearing
4 Receptacle
5 Molded part made from thermoplastic plastic
6 Radial projection
7 Radial projection
8 Radial projection
9 Radial projection
10 Through-bore
11 Groove
12 Opening
13 Axial gap
14 Circumferential groove
15 Snap ring
16 Groove in bearing carrier
17 Flange
18 Axial gap
19 Groove-shaped recess in bearing carrier
20 Flange section
21 Blind bore
22 Insert element
23 Thread
a Axial direction
r Radial direction
$s_1$ Radial extension of the molded part
$s_{1min}$ Minimum radial extension of the molded part
$s_{1max}$ Maximum radial extension of the molded part
$s_2$ Radial extension of the bearing carrier
$D_0$ Bearing outer diameter

The invention claimed is:

1. A bearing assembly comprising: a bearing and a bearing carrier for holding the bearing, wherein the bearing carrier includes a receptacle that is defined by an inner surface of the bearing carrier for a bearing ring of the bearing, the bearing being located in the receptacle of the bearing carrier, wherein the bearing carrier comprises a thermosetting plastic, wherein a connection between the bearing carrier and the bearing ring is produced at least partly by at least one molded part made from a thermoplastic plastic, and wherein the at least one molded part is positioned along the inner surface of the bearing carrier so as not to be embedded therein.

2. The bearing assembly according to claim 1, wherein the thermoplastic plastic is injected in at least one free space that is present between an inner circumference of the receptacle and an outer circumference of the bearing ring.

3. The bearing assembly according to claim 1 wherein the molded part forms a radial projection at least in one axial end region that radially projects over the bearing carrier and/or the bearing ring.

4. The bearing assembly according to claim 1, wherein the bearing carrier includes at least one through-bore for receiving an attachment means and/or wherein the bearing carrier includes at least one blind bore for the entry of the attachment means.

5. The bearing assembly according to claim 1, wherein an axial extension of the molded part is between 20% and 500% of an axial extension of the bearing ring.

6. The bearing assembly according to claim 1, wherein a maximum radial extension ($s_{1max}$) of the molded part in a region between the receptacle and the bearing ring, in millimeters, is:

$$s_{1max} = 1.7613 \cdot \ln(D_0) - 1.8079 \text{ for } 3 \text{ mm} < D_0 < 50 \text{ mm}$$

and $$s_{1max} = 1.0811 \cdot \ln(D_0) + 0.8021 \text{ for } D_0 \geq 50 \text{ mm}$$

where $D_0$ a bearing outer diameter in mm.

7. The bearing assembly according to claim 6, wherein a minimum radial extension ($s_{1min}$) of the molded part in a region between the receptacle and the bearing ring is 0.1 mm.

8. The bearing assembly according to claim 1, wherein the bearing carrier projects radially inward over the bearing ring in an axial end region so that the bearing ring is disposed with axial undercut in the bearing carrier.

9. The bearing assembly according to claim 8, wherein the molded part extends in an axial gap between the radially inwardly projecting region of the bearing carrier and the bearing ring of the bearing.

10. The bearing assembly according to claim 1, wherein the bearing ring includes a radially outwardly extending flange in an axial end region.

11. The bearing assembly according to claim 10, wherein the molded part extends in an axial gap between the flange and the bearing carrier.

12. The bearing assembly according to claim 10 wherein the flange and the bearing carrier end axially flush.

13. The bearing assembly according to claim 1, wherein the bearing ring extends radially into a groove-shaped recess in the bearing carrier so that the bearing ring is disposed with two-sided axial undercut in the bearing carrier and wherein the bearing carrier is comprised of at least two parts that are axially joined and together from the groove-shaped recess.

14. The bearing assembly according to claim 1, wherein the bearing ring includes a radially outwardly extending flange section that extends into a groove-shaped opening in the bearing carrier so that the flange section is disposed with two-sided axial undercut in the bearing carrier and wherein the bearing carrier is comprised of at least two parts that are axially joined and together form the groove-shaped recess.

15. The bearing assembly according to claim 1, wherein the bearing is a rolling-element bearing.

16. The bearing assembly according to claim 1, wherein the bearing carrier is part of an electric motor, or a fan, or a transmission.

17. A method for manufacturing a bearing assembly according to claim 1, comprising:
  a) placing the bearing ring in the receptacle of the bearing carrier;
  b) aligning the bearing ring relative to the bearing carrier in a desired position;
  c) injecting molten thermoplastic plastic in a ring gap between an inner circumference of the receptacle and an outer circumference of the bearing ring to produce the molded part; and
  d) allowing the injected thermoplastic plastic to cure.

18. The bearing assembly according to claim 1, wherein the maximum radial thickness ($s_{1max}$) of the connector, in millimeters, is:

$$s_{1max}=1.7613 \cdot \ln(D_0)-1.8079 \text{ for } 3 \text{ mm}<D_0<50 \text{ mm}$$

and $$s_{1max}=1.0811 \cdot \ln(D_0)+0.8021 \text{ for } D_0 \geq 50 \text{ mm}$$

where $D_0$ is a bearing outer diameter in mm.

19. A bearing assembly comprising a bearing carrier for holding at least one bearing, wherein the bearing carrier includes a receptacle for a bearing ring of the bearing, wherein the bearing carrier comprises a thermosetting plastic, wherein a connection between the bearing carrier and the bearing ring when the bearing ring is located in the receptacle is produced at least partly by at least one molded part made from a thermoplastic plastic, and wherein the bearing ring includes a circumferential bearing ring groove into which a snap ring is inserted, wherein the snap ring extends radially into a bearing carrier groove in the bearing carrier and is coated in the bearing carrier groove by a material of the molded part.

* * * * *